(12) United States Patent
Hayes, Jr.

(10) Patent No.: US 8,372,235 B2
(45) Date of Patent: Feb. 12, 2013

(54) METHOD AND APPARATUS FOR FABRICATING WELDED PLASTIC TUBE AND PIPE ASSEMBLIES

(76) Inventor: Frank F. Hayes, Jr., Fountain Valley, CA (US)

( * ) Notice: Subject to any disclaimer, the term of this patent is extended or adjusted under 35 U.S.C. 154(b) by 512 days.

(21) Appl. No.: 12/500,542

(22) Filed: Jul. 9, 2009

(65) Prior Publication Data

US 2011/0008558 A1    Jan. 13, 2011

(51) Int. Cl.
*B32B 38/00* (2006.01)
(52) U.S. Cl. ..................................... 156/272.2
(58) Field of Classification Search ............ 156/272.2, 156/304.1, 304.2, 157, 158
See application file for complete search history.

(56) References Cited

U.S. PATENT DOCUMENTS

| | | |
|---|---|---|
| 3,727,289 A | 4/1973 | Bemelmann et al. |
| 4,929,293 A | 5/1990 | Osgar |
| 6,177,652 B1 | 1/2001 | Ivansons |
| 6,395,127 B1 | 5/2002 | Johnson et al. |
| 6,629,551 B1 | 10/2003 | Johnson et al. |
| 7,398,813 B2 | 7/2008 | Ivansons et al. |
| 7,604,472 B2 | 10/2009 | Hayes, Jr. et al. |
| 8,066,269 B2 | 11/2011 | Ivansons et al. |
| 2005/0173056 A1* | 8/2005 | Landherr et al. ........... 156/272.8 |

* cited by examiner

*Primary Examiner* — Daniel McNally
(74) *Attorney, Agent, or Firm* — Larry K. Roberts

(57) ABSTRACT

Methods and apparatus are described for producing welded assemblies of plastic parts for use in fluid flow applications. A unit cell structure is disclosed for use in an assembly.

26 Claims, 11 Drawing Sheets

METHOD AND APPARATUS FOR FABRICATING WELDED PLASTIC TUBE AND PIPE ASSEMBLIES

BACKGROUND

Various types of plastic pipe and tube assemblies may be employed in fluid flow applications. The assemblies may for example be manifold assemblies, with an input port connecting to several output ports. Each of the ports may have tube or pipe fittings to allow the ports to be connected in a fluid system. The assemblies can have many ports, and reduction in footprint or size of the assemblies is desirable. Exemplary fluid flow applications include those in the pharmaceutical and semiconductor fabrication industries, where different fluids are passed through complex fluid flow paths.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
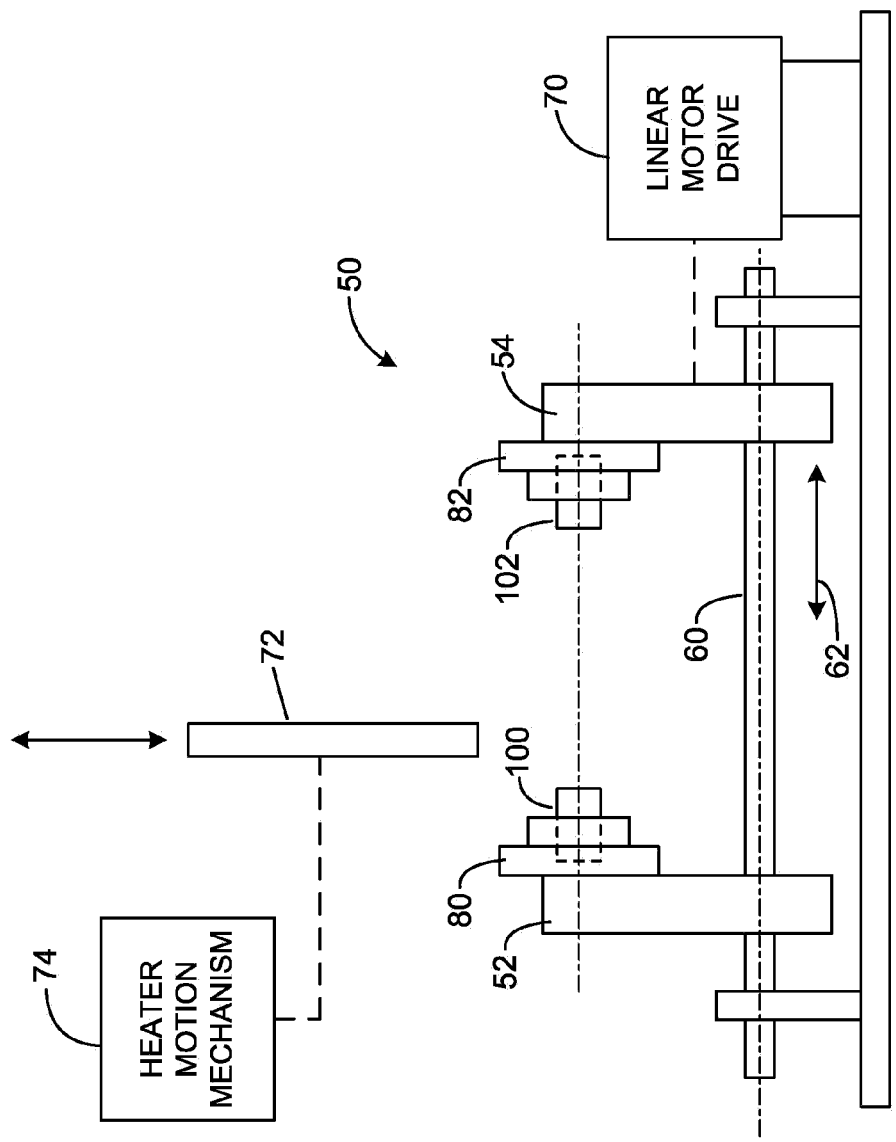
FIG. 1 is a diagrammatic schematic illustration of a system utilizing an exemplary embodiment of tooling to support workpieces during a welding process.

In the following detailed description and in the several figures of the drawing, like elements are identified with like reference numerals.

Methods and apparatus are described for fabricating welded plastic tube or pipe assemblies. In one embodiment, an assembly is fabricated utilizing an "as-molded" part including a tube or pipe portion, and welding the tube or pipe portion to a tube or pipe portion of a second part. The second part can be, or include, an "as molded" part, or a part processed after molding, e.g. by cutting a tube or pipe portion to length. As used herein, "as-molded" refers to a molded part, or a portion of the molded part to be welded to another part, in the state after being removed from the mold from which the part is fabricated, without further processing, such as cutting a tube or pipe portion to length. Production efficiency and weld repeatability is facilitated by the use of tooling utilizing an interference fit in a "snap-nest" arrangement to hold the two parts to be welded, without the use of multi-piece clamps to hold the parts during heating and welding. In an exemplary embodiment, the tooling pieces support the parts during fabrication, and allow the welded assembly to be readily removed after the welding process is complete from the tooling without the use of fasteners or tools.

The plastic parts in exemplary embodiments may be fabricated from PFA (perfluoroalkoxy), FEP (fluoroethyl propylene), PVDF (polyvinyldene fluoride), and polypropylene (PP).

In an exemplary embodiment, the plastic parts may be welded together using a system 50 illustrated in FIG. 1. The system includes a linear bearing 60, on which tooling support structures 52 and 54 are supported for relative motion along the bearing 60, along axis 62. The motion is driven by a motor drive 70. In an exemplary embodiment, the tooling support structure may be fixed in position along axis 62, and only the tooling support structure 54 moved by the motor drive 70. In other embodiments, both tooling support structures may be moved along the linear axis. The motor drive may include a leadscrew turned by the motor, and a nut fixed to the support structure 54, to convert rotary motion of the motor shaft into precisely controlled linear movement. Other drive mechanisms can alternatively be employed. A radiant heater 72 may be positioned by a heater motion mechanism 74 to a heating position between the tooling support structures, or in a home position out of the way of the tooling support structures. The heater 72 may be electrically powered, and is employed to apply radiant heat to workpieces supported by the system. The motor drive system 70 may be controlled by an electronic control system.

To the extent just described, the system 50 is conventional. Suitable welding systems are commercially available, e.g. from Entegris, GF, Asahi and Kits/G NS.

Figure 2:
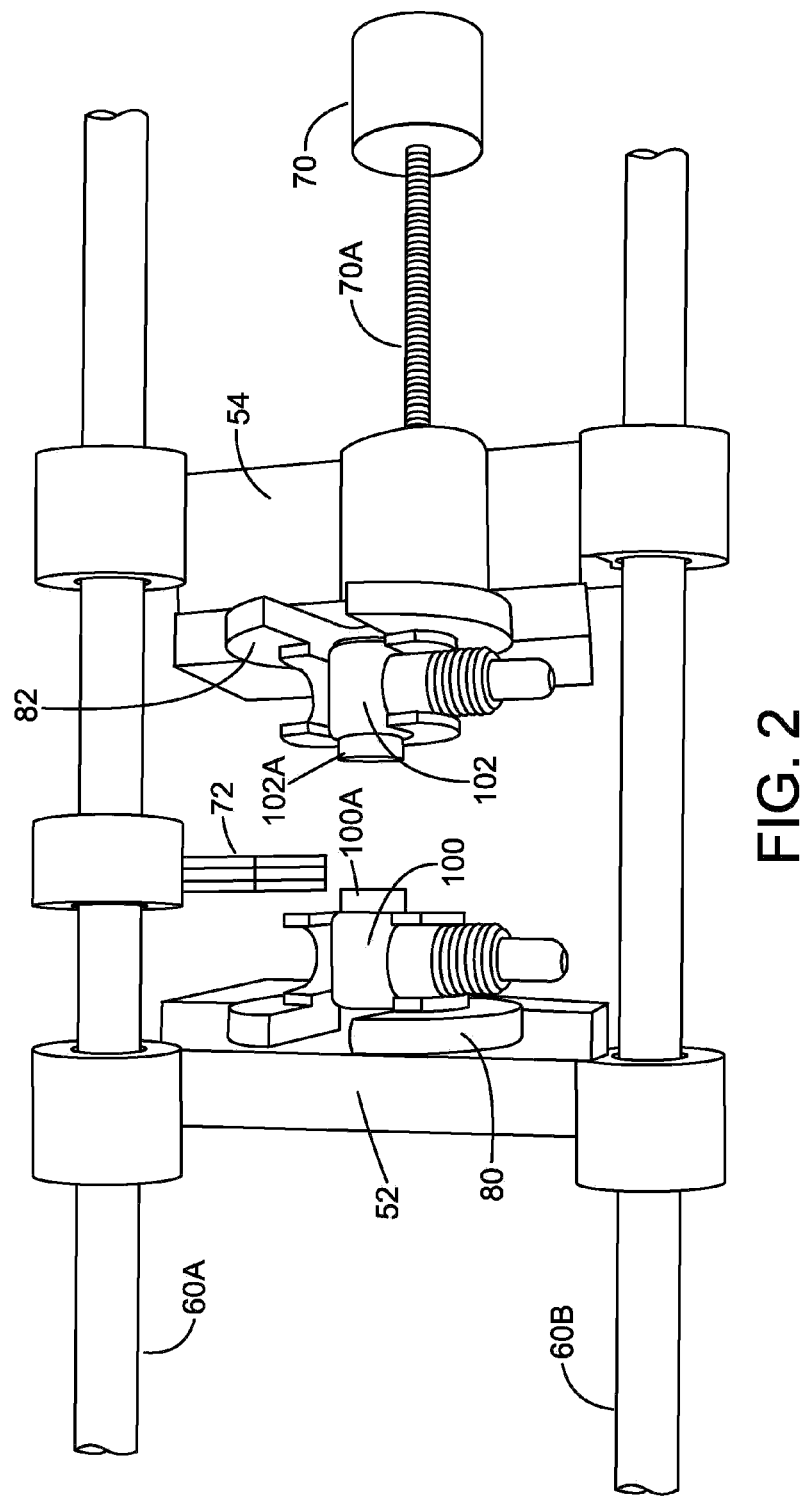
FIG. 2 is a close up view illustrating the tooling of FIG. 1 in a separated position.

FIG. 2 illustrates exemplary features of an exemplary embodiment of the tooling structures 80 and 82, supporting exemplary plastic parts or workpieces 100 and 102. In this example, the linear bearing includes linear bearing bars or ways 60A, 60B on which the tooling support structures 52, 54 are mounted for sliding movement. The structure 52 may be fixed in desired positions along the bearing ways, and the structure 54 is driven by motor system 70 including leadscrew 70A to provide relative motion between the tooling structures 80 and 82, respectively supported on support structures 52 and 54. The tooling structures 80 and 82 support workpieces 100 and 102 in an axially aligned configuration, to allow welding of the facing tube or pipe ends 100A, 102A of the workpieces. The heater 72 is shown in a rest or home position, away from the tooling and workpieces in FIG. 2.

Figure 3:
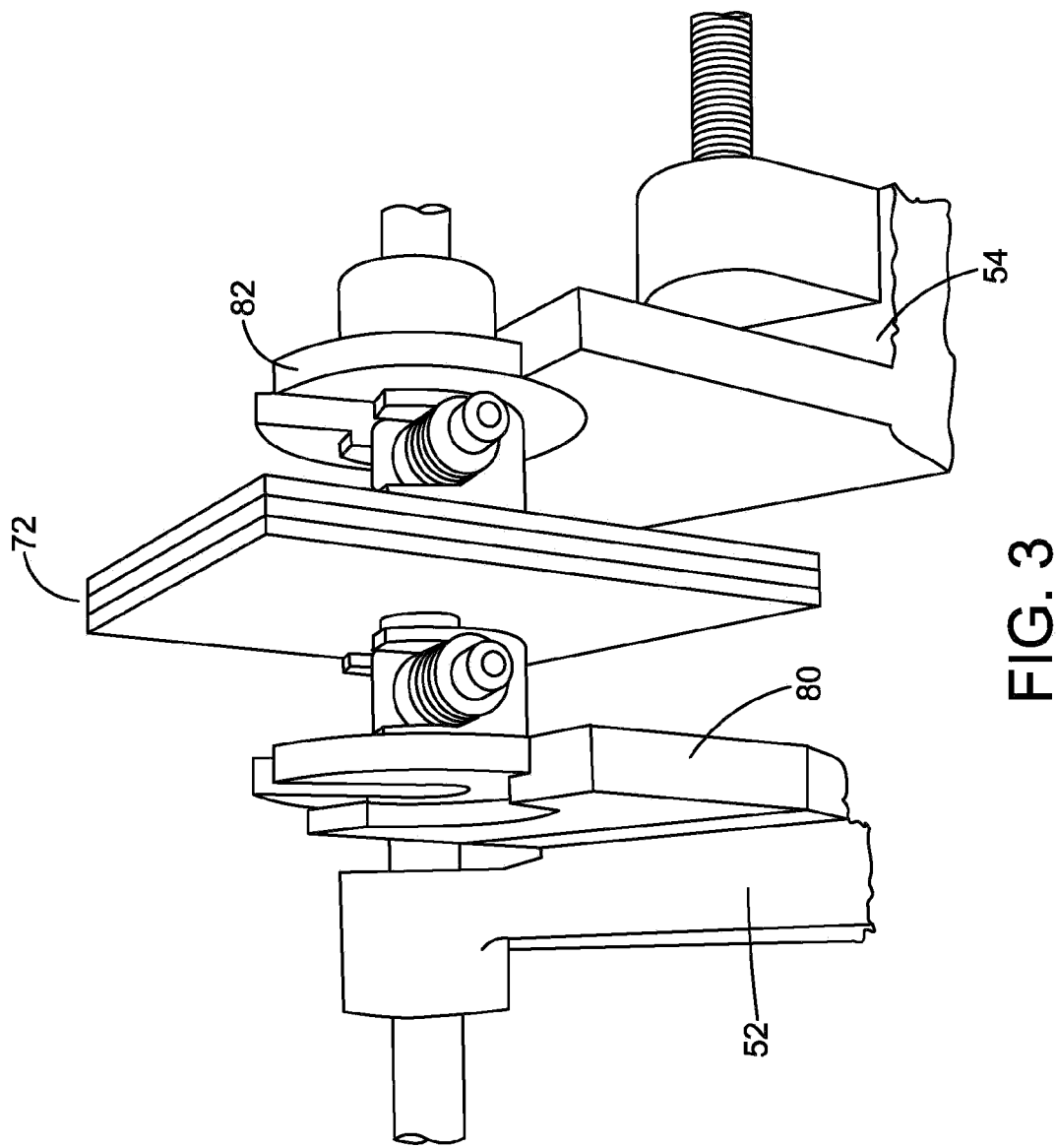
FIG. 3 is a view similar to FIG. 2, but with a radiant heater element positioned in close non-contacting relationship with the ends of the workpieces, to heat the ends to a melted state.

FIG. 3 is a fragmentary view, showing the heater in a workpiece heating position between the adjacent surfaces of the workpieces 100, 102 to be welded. In an exemplary embodiment, the heater heats the adjacent workpiece surfaces by radiant non-contacting heating. Thus, the heater 72, which may be a relatively thin structure having opposed generally planar heated surfaces, does not contact the workpieces during the heating process, to avoid contamination of the workpieces. The heater radiates sufficient energy to render the tube ends to a melted state, to a melt depth of between about 0.5 mm to 1 mm. In an exemplary embodiment, the heater is an infrared heater, and the spacing between the heater and adjacent part surfaces to be heated as well as the heat time may be determined empirically to render the part ends to a melted state. In an exemplary embodiment, the heat time for PFA parts is about 30 seconds for tube ends, and about 50 seconds for pipe ends. PP has lower melt temperature, and so PP tube parts may have a heat time on the order of 15 seconds. Sometimes the part on one side of the heater will heat faster than the part on the other side of the heater, and the spacing settings can be adjusted by moving that side further away from the heater.

It will be understood that the heater motion may be controlled manually to move the heater from its rest position to the part heat position, or it may be controlled automatically by a controller.

Figure 4:
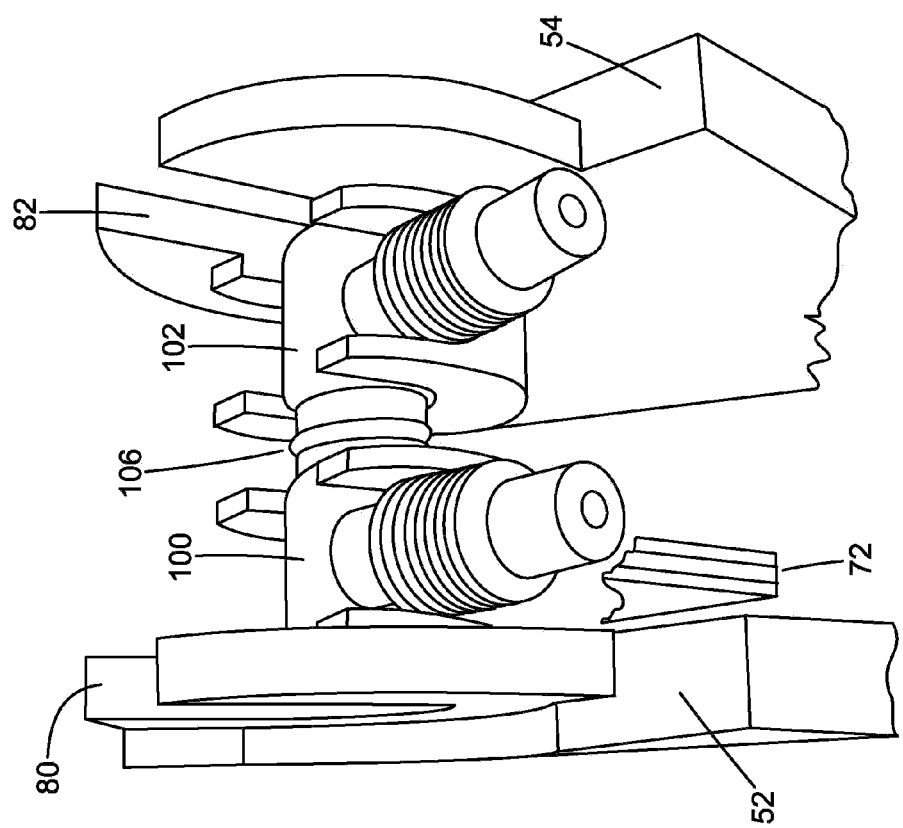
FIG. 4 illustrates the workpieces and tooling in the weld position, in which the tooling has been brought closer together to bring the heated ends of the workpieces in contact.

In an exemplary embodiment, the tube or pipe ends 100A, 102A are heated sufficiently by the heater to a melted state, with a melt depth of about 0.5 0.5 mm to 1 mm for PFA parts, although that depth may vary depending on the part configuration and material. After the part surfaces have been heated, which may be for a predetermined heat interval based on the part configuration and material, the heater 72 is withdrawn from between the heat position illustrated in FIG. 4, to a home position as shown in FIG. 2, for example. Now the motor drive system 70 is actuated to provide relative motion between the tooling support structures 52 and 54, to bring the tube or pipe ends 100A, 102A into contact to butt weld the parts together. This position is illustrated in FIG. 4, with the resultant weld bead 106 formed at the joinder of the two parts 100, 102 to form a welded part assembly. Once the parts have cooled sufficiently to make permanent the weld, the assembly is removed from the tooling structures 80, 82 by lifting the parts from the tooling structures without the use of tools.

Figure 5A:
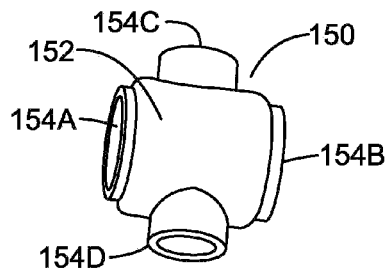
FIG. 5A is an isometric view of an exemplary embodiment of an as-molded unit 4-port manifold cell.

The welding system and method may be advantageously employed with "as-molded" plastic parts, including a unit cell part 150, an example of which is illustrated in FIG. 5A. The unit cell 150 has a hollow cylindrical body portion 152, from which ports 154A, 154B project along the axis of the body portion, and ports 154C, 154D project transverse to the axis of the cylindrical body portion. In this example, the axial ports 154A, 154B take the form of short tube or pipe portions with open ends, and have an inner diameter equal to the inner diameter of the body portion. The transverse ports 154C, 154D in this example also take the form of tube or pipe portions, with inner diameters smaller than that of the body portion. The axial ports are fabricated as short hollow tube portions, which can be welded to corresponding tube portions on other parts. The shortness of the tube or pipe portions facilitates welding fabrication of assemblies with high part densities, resulting in assemblies with very small footprints. For example, for exemplary as-molded tube unit cell parts, the tube portions may have a length dimension in a range of about 1 mm to 40 mm. An exemplary tube portion outer diameter (OD) range is ⅛ inch (3 mm) to 2½ inch (63 mm). The welding techniques described herein permit welding of parts with very short tube portion lengths, as noted above. For example, a unit cell (described below) may have a tube portion length of 2 mm, and in an exemplary range may have lengths in the 1 mm to 5 mm range.

The unit cell 150 may be used as a unit in fabricating a welded fluid flow manifold assembly, for example. Tooling structures may be employed to support the unit cell part during the welding process, by "snap-nesting" the body portion of the part in a receptacle region. In one exemplary embodiment, the unit cell part can be snap-nested in the tooling structure so that any one of its ports is positioned for welding. Unit cell structures of different tube or pipe interior diameters and exterior diameters may be employed, to address requirements of varying applications.

Figure 5B:
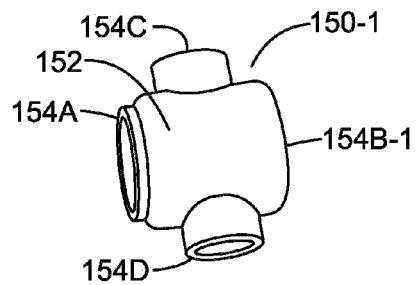
FIGS. 5B, 10 and 11 are isometric views of an as-molded unit manifold cell similar to that of FIG. 5A, with one end cap.

The particular configuration of the ports of the unit cell part may vary, depending on the particular part to be used in a particular welded plastic part assembly. For example, FIG. 5B shows a unit cell part 150-1, in which the port 154B-1 is capped by a wall formed integrally with the body portion 152. The other ports 154A, 154C and 154D are the same as described above regarding FIG. 5A. The unit cell part 150-1 may also be used in a welded manifold assembly, in which the part 150-1 is the outer or last part in the manifold.

Figure 5C:
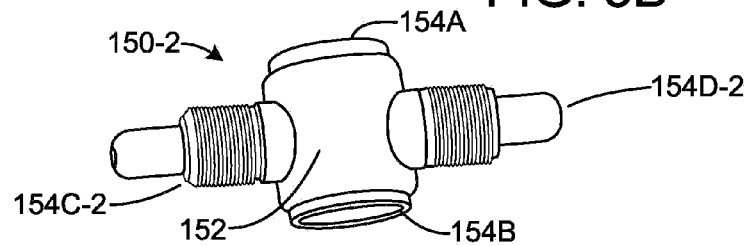
FIG. 5C illustrates an exemplary embodiment of another as-molded part in which two opposed ports have molded threaded extensions.

FIG. 5C illustrates another exemplary variation of the unit cell part, in which the transverse ports 154C-2 and 154D-2 are fabricated as threaded nipples. The part can be snap-nested in a tooling structure by interference fit of the body portion 152 through a region of reduced width relative to the part width, and pushing the part into a nest position in which the tooling width is nominally the same or slightly larger than the part width. An exemplary snap nest interference is 0.5% to 1.5% of the part width or diameter.

Each of the parts shown in FIGS. 5A, 5B and 5C can be fabricated by injection molding, to result in as-molded parts, in which no further processing steps such as cutting to length are utilized. The as-molded parts provide the advantage of dimensional uniformity from part-to-part, which facilitates welding processes in the system and method described above.

Figure 5D:
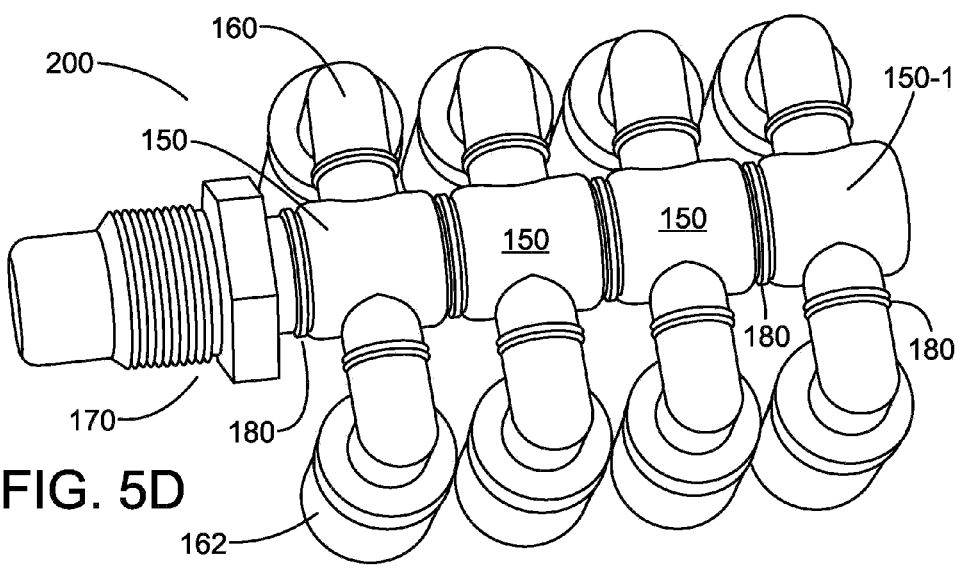
FIG. 5D illustrates one exemplary assembly fabricated from welded plastic parts.

FIG. 5D illustrates an exemplary manifold assembly 200, fabricated by welding together several unit cell parts 150, with a termination by a capped unit cell 150-1. The transverse ports of the unit cells are each welded to an elbow part 160, using the system 50, and with part-appropriate tooling structures to snap-nest the parts in place. Each elbow part 160 may be an as-molded part with a nut 170 fitted over its distal end to connect to a corresponding tube (not shown). The clearance between adjacent elbow parts can be close, with only sufficient room to allow the adjacent nuts to be fitted and turned to engage the corresponding tube. The welding process allows the close packing of the adjacent unit cells in the manifold, thereby reducing the footprint size of the assembly. A threaded connector 170 is welded to an axial port of the unit cell on the input side of the assembly to provide a connection to another system or tube (not shown). The weld connections result in weld beads 180. The elbow parts 160 are merely shown as examples; other part types could be welded to the transverse ports, depending on the application.

Figure 6:
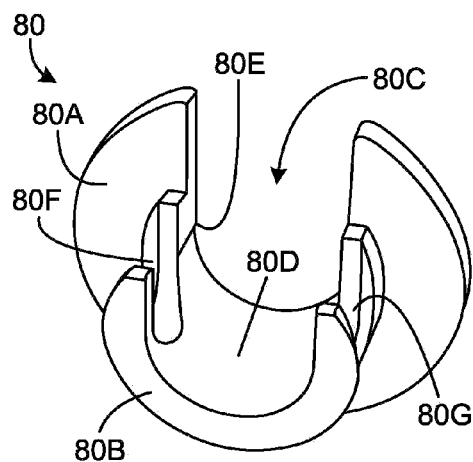
FIG. 6 illustrates an exemplary embodiment of a tooling structure configured for snap-nesting a workpiece during a welding procedure.
Figure 6A:
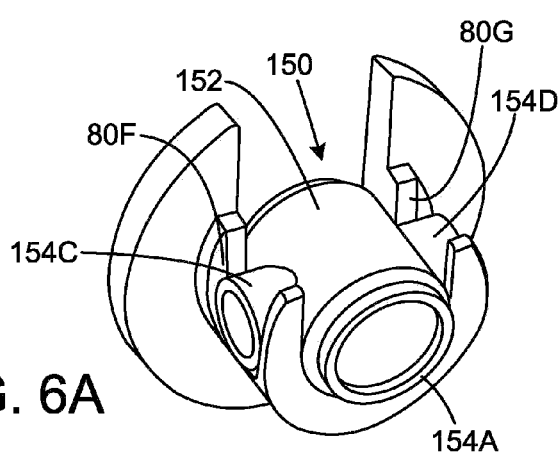
FIG. 6A is an isometric view of the exemplary tooling structure in which an exemplary plastic workpiece has been snap-nested in place.
Figure 6B:
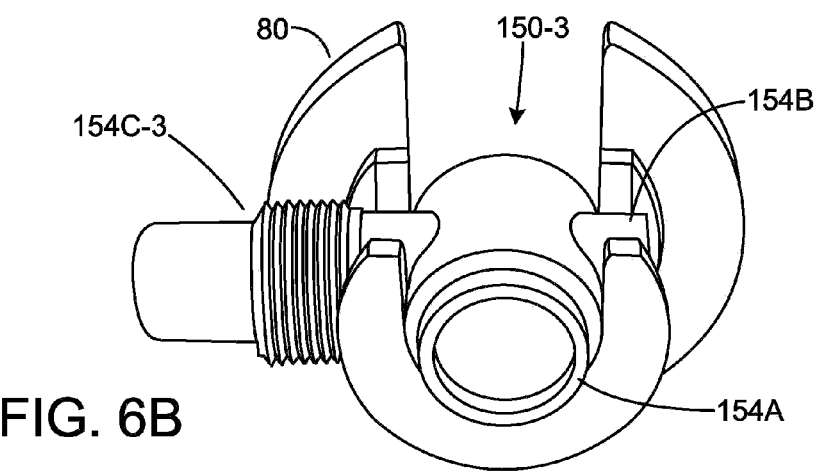
FIG. 6B is an isometric view of the exemplary tooling structure in which another exemplary plastic workpiece has been snap-nested in place.

FIGS. 6, 6A and 6B illustrate a first exemplary embodiment of a tooling structure 80 used to support a part in a snap-nest arrangement during a welding procedure. In this example, the tooling structure 80 includes a generally flat plate portion 80A from which a transverse support portion 80B extends. A generally U-shaped open channel or slot 80C is formed in the plate portion and the transverse support portion. The top open portion of the slot 80C has a width dimension selected to be slightly larger than the outer diameter of the body portion of the part to be supported, and the bottom closed portion 80D is generally sized to the same radius dimension as the width of the top open portion to accept the body portion. The width of the top portion and the radius of the bottom closed portion is slightly larger than the nominal width of the part, e.g. 0.001 inch to 0.002 inch, to provide some tolerance. An intermediate portion 80E of the channel is sized to be slightly smaller in width dimension than the outer diameter of the body portion of the part to be supported to create a slight obstruction to passage of the part, so that the part is "snapped" or pushed down through the intermediate portion to a nested position at the bottom of the channel. The intermediate portion creates an interference fit, tending to hold the part in the nested position at the bottom of the channel. The tooling structure 80 situates the end of the tubing portion to be melted quite close to the center of the part body; by snap-nesting the part during the welding process, without the need for other clamping structures, the tube or pipe portion length extending from the tooling structure can be significantly reduced. The shortness of the tube or pipe length portion leads to improved weld quality, and allows small footprint size of resulting assemblies.

The transverse portion 80B of tooling structure 80 has a profile which generally matches the profile of the lower slot portion 80C, and also has opposed generally U-shaped channels or slots 80F and 80G formed therein. These opposed slots are sized to receive therein the transverse portions of a part held in the tooling structure, and forms an inverted saddle portion. The transverse part structures can protrude into the opposed channels of the transverse portion 80B, and provide additional stability and support to the part. The channels 80F and 80G may include intermediate regions of reduced width, similar to region 80E, if additional interference or snap force is desired to hold a particular part in the nested position. For many applications, however, the transverse slot regions will not include interference fit portions, as the interference force supplied by intermediate region 80C will be sufficient. Moreover, increasing the interference force also increases the force needed to remove the part from the tooling structure, which may be undesirable for many applications. The ease of use of the tooling structures is an advantage.

The tooling structure 80 is preferably configured for attachment to a tooling support fixture 52, e.g. by the use of threaded fasteners, to allow the tooling to be changed as needed to weld part assemblies of different types or sizes.

FIG. 6A illustrates the tooling structure 80 holding in a nested position a unit cell part 150. The transverse port portions 154C and 154D of the part 150 are supported in the respective transverse channels 80F and 80G, and the axial port portion 154A is exposed from the end of the transverse portion 80B of the tooling structure for welding.

The exemplary tooling structure 80 can accommodate different parts. For example, as shown in FIG. 6B, the tooling structure supports a part 150-3, a unit cell part in which one of the transverse ports 154C-3 is an extended threaded nipple.

Figure 7:
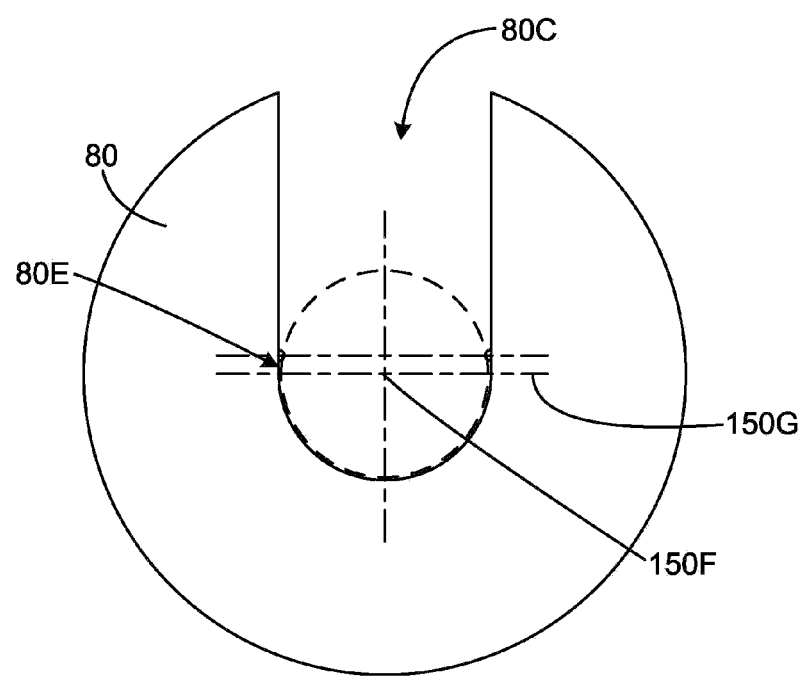
FIG. 7 is a rear view of the exemplary tooling structure of FIG. 6, illustrating a region of reduced width dimension to create an interference fit for a plastic workpiece, holding the workpiece in place without clamping during a welding process.

FIG. 7 is a back view of the tooling structure 80, showing the interference region 80E in relation to the center line 150G of a part whose body portion defines a circular area indicated in phantom in FIG. 7. The region 80E may exist on both sides of the channel, or only on one side. The region 80E may be a bump or feature protruding from the wall of the channel, to create a pinch point or points. In one exemplary embodiment, the feature is sized to reduce the width dimension of the channel to provide interference on the order of 0.5% to 1.5% of the width or diameter of the part. For example, say the body portion of the part has a diameter of 0.875 inch. The channel 80C may have a width dimension of 0.875 inch plus a small tolerance increment, on the order of 0.002 or 0.003 inch, for example, to allow the body portion to fit into the channel. The interference region has a width dimension smaller than the width of the body portion of the part, e.g. between 0.865 inch and 0.870 inch, providing interference between the channel walls at 80E and the part body portion. The part is pushed downwardly or snapped into the bottom of the channel, causing the body to be compressed slightly to pass through the interference portion, with the part being received in the bottom of the channel in a snap-nested position.

Figure 8:
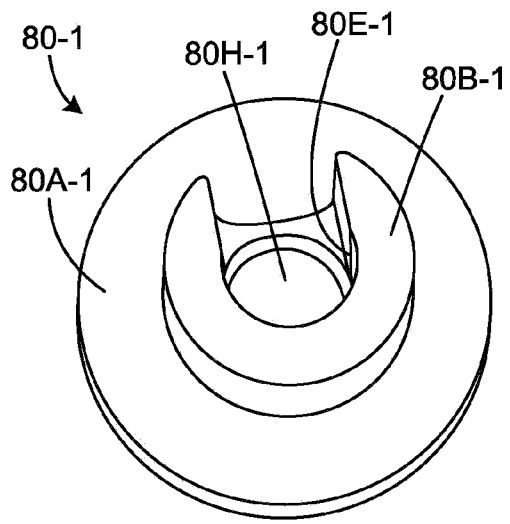
FIG. 8 illustrates an alternate exemplary embodiment of a tooling structure configured for snap-nesting a workpiece during a welding procedure.
Figure 8A:
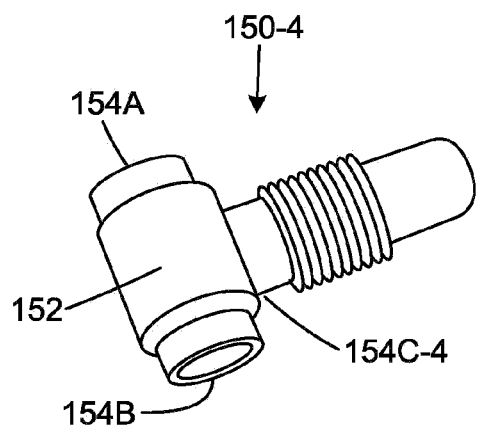
FIG. 8A is an isometric view of an exemplary embodiment of an as-molded plastic part suitable for use with the tooling structure of FIG. 8.
Figure 8B:
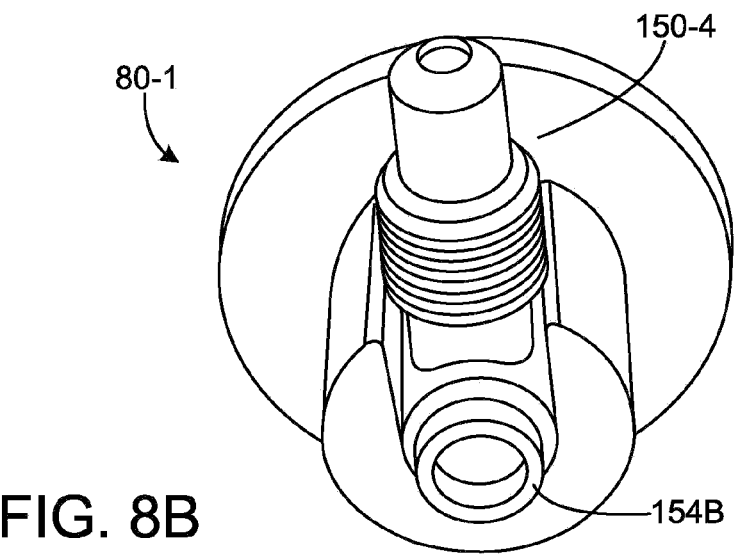
FIG. 8B is an isometric view of the alternate tooling structure in which the exemplary plastic workpiece depicted in FIG. 8A has been snap-nested in place.

Different tooling structures may be employed to accommodate different parts to be welded in the welding system. FIG. 8 illustrates an alternate tooling structure 80-1, which includes a plate portion 80A-1 and a transverse portion 80B-1. The plate portion has a hole 80H-1 formed therein, in lieu of a channel, which is sized to accommodate the rear axial port portion of a part. The transverse portion 80B-1 has a channel region formed therein to accept the part. The channel region includes an interference region 80E-1 of reduced dimension. The transverse portion does not include, in this example, any transverse channel regions, and forms a cradle region for supporting a part. The tooling structure 80-1 accepts a part such as part 150-4 shown in FIG. 8A. The part 150-4 is based on a unit cell part, and one transverse port 154C-1 is formed as a threaded nipple portion, and the other transverse port is closed, forming a three port part. FIG. 8B shows the part 150-4 in a snap-nested position in the tooling structure 80-1, with the port portion 154C-4 extending upwardly in the channel defined in the transverse portion of the tooling. The end of the axial port 154B of the part protrudes from the tooling structure face, to be welded to a corresponding part using the system depicted above in FIGS. 1-4.

Figure 9:
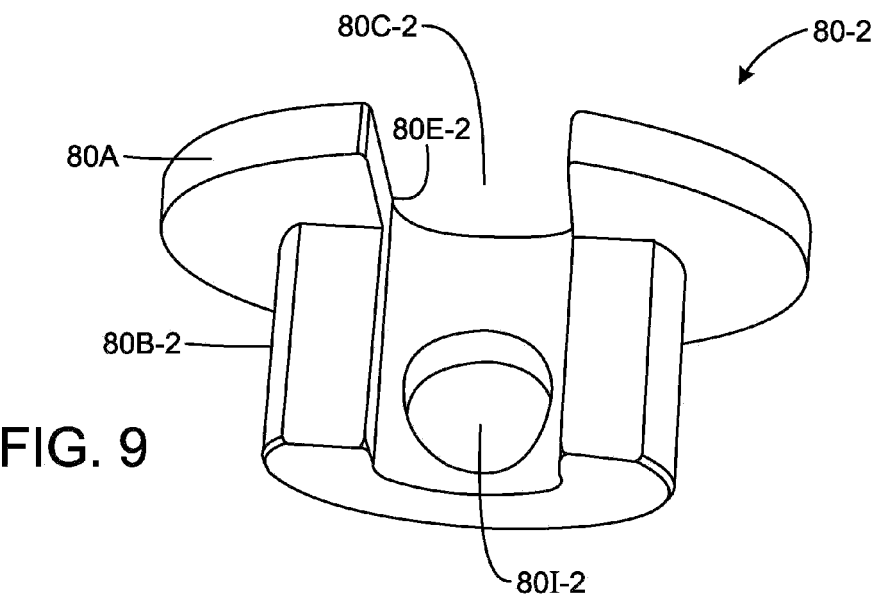
FIG. 9 illustrates another alternate exemplary embodiment of a tooling structure configured for snap-nesting a workpiece during a welding procedure.
Figure 9A:
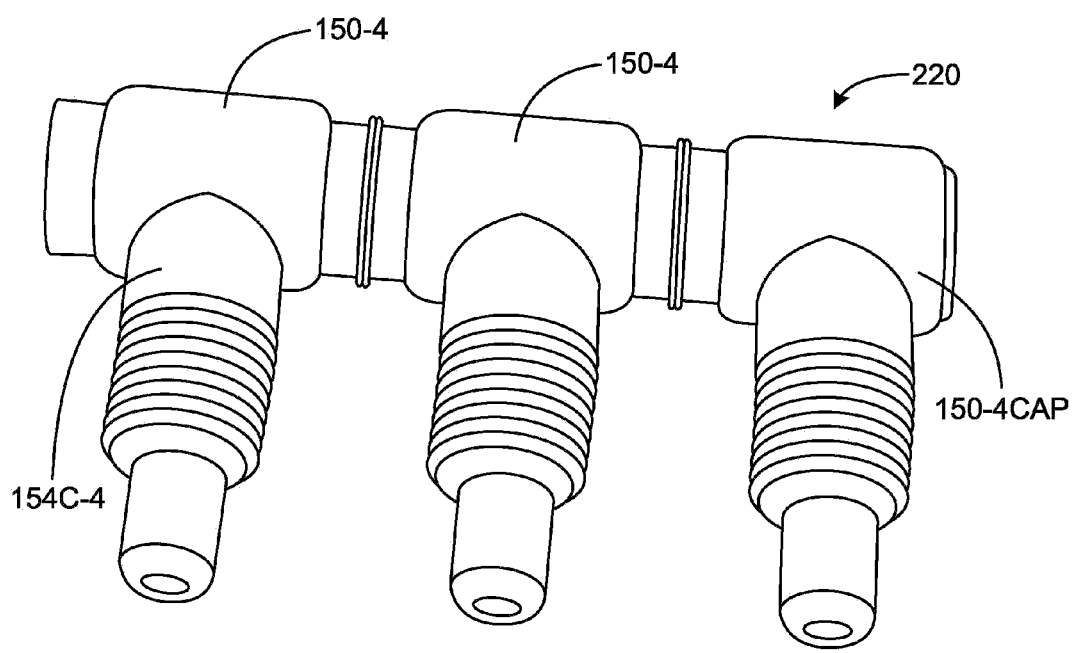
FIG. 9A is an isometric view of an exemplary embodiment of a plastic part assembly suitable for use with the tooling structure of FIG. 9.
Figure 9B:
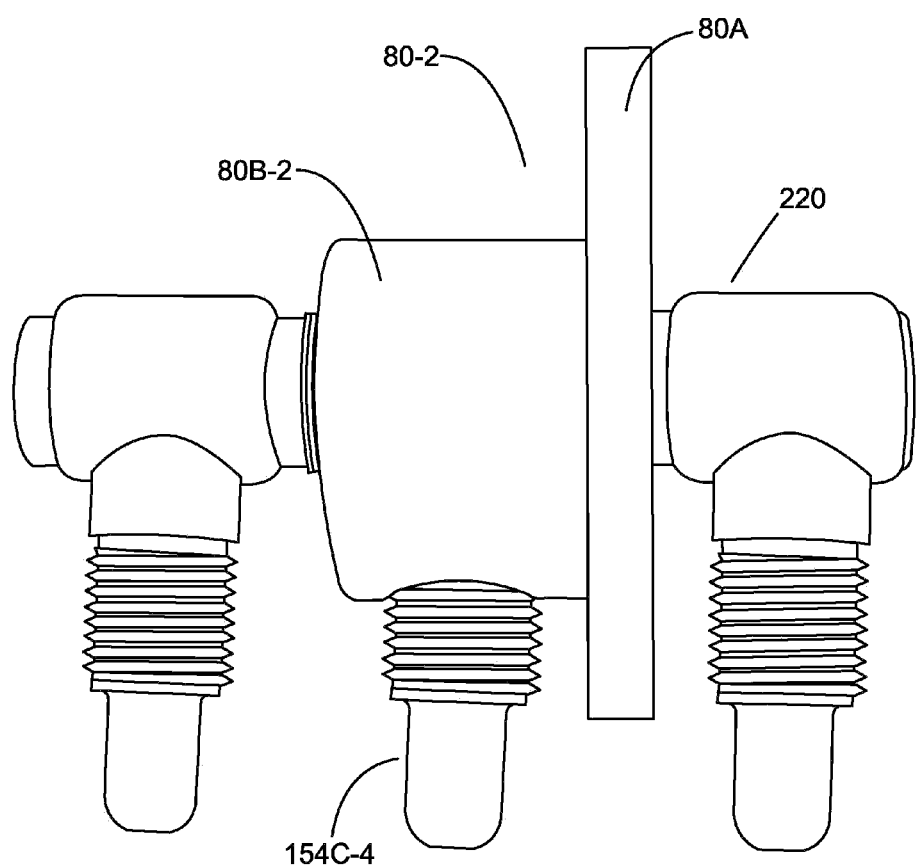
FIG. 9B is a side view of the alternate tooling structure of FIG. 9 in which the exemplary plastic workpiece assembly depicted in FIG. 9A has been snap-nested in place.
Figures 10, 11:
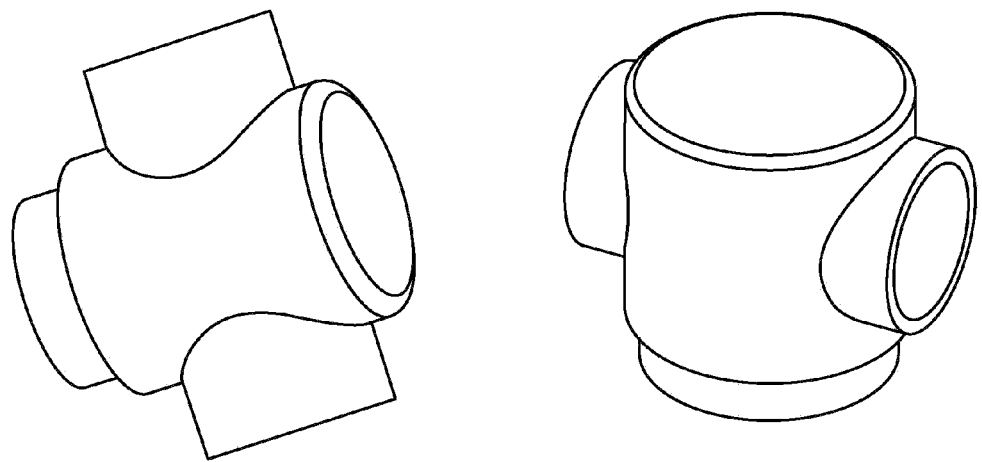
Figure 12:
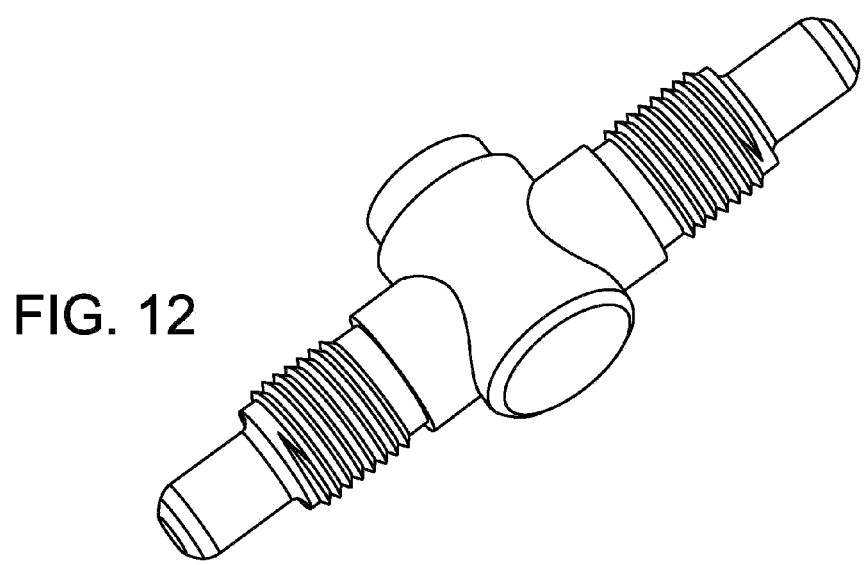
FIG. 12 is an isometric view of a part similar to that of FIG. 5C, with one end cap.

FIG. 9 shows another alternate tooling structure 80-2, in which both the plate region 80A and the transverse region 80B-2 have a channel region 80C-2 formed therein, and with an interference region 80E-2. In this exemplary tooling, a hole 801-2 is formed in the bottom of the channel region in the transverse portion 80B-2, to accept a downwardly extending transverse port structure of a part while in a snap-nested position within the tooling channel. The hole has a diameter dimension generally equal to the outer dimension of the transverse port structure of the part, and provides additional support and stability. The hole also allows an assembly formed from welded parts such as part 150-4 to be progressively supported for welding. An example assembly 220 is depicted in FIG. 9A, which has been fabricated by welding parts 150-4 together in a manifold assembly, with the final as-molded part (150-4 CAP) having a capped outer axial port. FIG. 9B shows how the assembly can be supported for welding successive unit cell parts, with the transverse port portion 154C-4 protruding downwardly through the hole 801-2, when the part is held in the snap-nested position in the tooling structure.

There has been described a method for welding together plastic parts to form an assembly or part of an assembly, which includes:

positioning an as-molded first plastic part including a tube portion in a first tooling structure and snap-fitting the first plastic part in the first tooling structure by an interference snap fit;

positioning a second plastic part including a tube or pipe portion in a second tooling structure and snap-fitting the second plastic part in the second tooling structure by an interference snap fit, such that the respective tube or pipe portions of the first and second plastic parts are axially aligned and facing each other in a separated start position with a gap between facing ends of the respective tube portions;

positioning a radiant heating element in the gap without physically contacting the respective tube or pipe portions to heat the facing ends to a melted state;

removing the radiant heating element from the gap; and providing relative motion between the first and second tooling structures along an axis to respective weld positions to bring the facing ends of the respective first and second plastic parts together, leaving the first and second tooling structures in said weld positions until the parts have cooled to weld the first and second parts at said respective ends to form an assembly.

In another aspect, an assembly of welded plastic parts for a fluid flow application has been described. In one exemplary embodiment, the assembly includes first and second as-molded manifold unit cell structures, each cell structure having a tubular body portion, the tubular portion extending axially from a first end of the tubular body portion. The second and third opposed transverse tubular portions extend from an intermediate portion of the tubular body portion transverse to the tubular portion. The tubular body portion of the first unit cell structure is welded to the tubular body portion of the second unit cell structure in an axially aligned configuration.

In accordance with another aspect, an as-molded plastic unit cell structure for use in fabricating welded fluid flow assemblies has been described. The unit cell structure includes a hollow tubular body portion having a tube or pipe end configured for welding to another plastic part in a fabrication process for an assembly. A first tubular portion extends axially from a first end of the tubular body portion. A second tubular portion extends axially from an opposed second end of the tubular body portion. In an exemplary embodiment, the first tubular portion has a length in a range of 1 mm to 40 mm.

Although the foregoing has been a description and illustration of specific embodiments of the subject matter, various modifications and changes thereto can be made by persons skilled in the art without departing from the scope and spirit of the invention as defined by the following claims.

What is claimed is:

1. A method for welding together plastic parts to form an assembly or part of an assembly comprising:
    positioning an as-molded first plastic part including a tube or pipe portion in a first tooling structure by pushing the first plastic part through an first interference region in the first tooling structure to a snap-nested position in which the part is held in place by interference with the interference region, said tube or pipe portion including a tubular body portion extending axially from a first end of the tubular body portion, the as-molded first plastic part further including a transverse tubular portion extending from an intermediate portion of the tubular body portion transverse to the tubular body portion;
    positioning a second plastic part including a tube or pipe portion in a second tooling structure by pushing the second plastic part through a second interference region in the second tooling structure to a snap-nested position in which the part is held in place by interference with the second interference region, such that the respective tube or pipe portions of the first and second plastic parts are axially aligned and facing each other in a separated start position with a gap between facing ends of the respective tube portions;
    positioning a radiant heating element in the gap without physically contacting the respective tube or pipe portions to heat the facing ends to a melted state;
    removing the radiant heating element from the gap;
    providing relative motion between the first and second tooling structures along an axis to respective weld positions to bring the facing ends of the respective first and second plastic parts together, leaving the first and second tooling structures in said weld positions until the parts have cooled to weld the first and second parts at said respective ends to form an assembly.

2. The method of claim 1, wherein said positioning the first plastic part in the first tooling structure in a snap-nested position comprises:
    pushing the first part downwardly in a generally U-shaped channel in the first tooling structure such that the tubular body portion of the first part engages and is pushed past an interference region of the channel of reduced dimension to nest the first part into the snap-nested position at the bottom of the channel and supporting a body portion of the first part in a transverse portion of the first tooling structure.

3. The method of claim 2, wherein the transverse portion of the first tooling structure includes a generally U-shaped channel region, and the body portion of the first part is received in the U-shaped channel region in the snap-nested position during said heating and welding steps.

4. The method of claim 2, wherein the transverse portion of the first tooling structure includes an opening configured to receive the transverse tubular portion of the first part, and said step of positioning said first plastic part includes:
    inserting the transverse tubular portion of the first part through said opening as said first part is positioned in said snap-nested position.

5. The method of claim 1, wherein said positioning the first plastic part in the first tooling structure in a snap-nested position is accomplished without the use of multi-piece clamps to hold the first plastic part during heating and welding.

6. The method of claim 5, wherein said positioning the second plastic part in the second tooling structure in a snap-nested position is accomplished without the use of multi-piece clamps to hold the second plastic part during heating and welding.

7. The method of claim 1, further comprising:
    removing the assembly from the tooling structures in said weld positions by lifting the assembly in a direction transverse to the axis to overcome the interference of the first and second interference regions.

8. The method of claim 1, wherein the first and second plastic parts are fabricated of PFA (perfluoroalkoxy), FEP (fluoroethyl propylene), PVDF (polyvinyldene fluoride) or polypropylene (PP).

9. The method of claim 1, wherein the second plastic part is an as-molded plastic part.

10. The method of claim 1, wherein said tube or pipe portions have a length in the range of 1 mm to 5 mm.

11. A method for welding together plastic parts to form an assembly or part of an assembly comprising:
    positioning an as-molded first plastic part including a tube or pipe portion in a first tooling structure by pushing the first plastic part through an first interference region in the first tooling structure to a snap-nested position in which the part is held in place by interference with the interference region, said tube or pipe portion including a tubular body portion extending axially from a first end of the tubular body portion, the as-molded first plastic part further including a first transverse tubular portion extending from an intermediate portion of the tubular body portion transverse to the tubular body portion;

positioning a second plastic part including a tube or pipe portion in a second tooling structure by pushing the second plastic part through a second interference region in the second tooling structure to a snap-nested position in which the part is held in place by interference with the second interference region, such that the respective tube or pipe portions of the first and second plastic parts are axially aligned and facing each other in a separated start position with a gap between facing ends of the respective tube portions;

positioning a radiant heating element in the gap without physically contacting the respective tube or pipe portions to heat the facing ends to a melted state;

removing the radiant heating element from the gap;

providing relative motion between the first and second tooling structures along an axis to respective weld positions to bring the facing ends of the respective first and second plastic parts together to weld the first and second parts at said respective ends to form an assembly.

12. The method of claim 11, wherein said positioning the first plastic part in the first tooling structure in a snap-nested position comprises:

pushing the first part downwardly in a generally U-shaped channel in the first tooling structure such that the tubular body portion of the first part engages and is pushed past an interference region of the channel of reduced dimension to nest the first part into the snap-nested position at the bottom of the channel and supporting a body portion of the first part in a transverse portion of the first tooling structure.

13. The method of claim 12, wherein the transverse portion of the first tooling structure includes a generally U-shaped channel region, and the body portion of the first part is received in the U-shaped channel region in the snap-nested position during said heating and welding steps.

14. The method of claim 12, wherein the first part includes a transverse portion transverse to the tube or pipe end portion, and the transverse portion of the first tooling structure includes an opening configured to receive the first transverse tubular portion, and said step of positioning said first plastic part includes:

inserting the first transverse tubular portion through said opening as said first part is positioned in said snap-nested position.

15. The method of claim 11, wherein said first plastic part is a manifold cell structure, said tubular portion extending axially from a first end of the tubular body portion, and a second transverse tubular portion extends from an intermediate portion of the tubular body portion transverse to the tubular portion, and wherein said positioning first plastic part in a first tooling structure and positioning the first plastic part in the first tooling structure in a snap-nested position comprises:

pushing the first part downwardly in a generally U-shaped channel in the first tooling structure such that the tubular body portion of the first part engages and is pushed past an interference region of the channel of reduced dimension to nest the first part into the snap-nested position at the bottom of the channel.

16. The method of claim 15, wherein the first tooling structure further includes a transverse portion having opposed generally U-shaped channels to support said first and second tubular portions at said engaged position to prevent rotation of said first part in said first tooling structure.

17. The method of claim 11, wherein said positioning the first plastic part in the first tooling structure in a snap-nested position is accomplished without the use of multi-piece clamps to hold the first plastic part during heating and welding.

18. The method of claim 17, wherein said positioning the second plastic part in the second tooling structure in a snap-nested position is accomplished without the use of multi-piece clamps to hold the second plastic part during heating and welding.

19. The method of claim 11, further comprising:

removing the assembly from the tooling structures in said weld positions by lifting the assembly in a direction transverse to the axis to overcome the interference of the first and second interference regions.

20. The method of claim 11, wherein the first and second plastic parts are fabricated of PFA (perfluoroalkoxy), FEP (fluoroethyl propylene), PVDF (polyvinyldene fluoride) or polypropylene (PP).

21. The method of claim 11, wherein the second plastic part is an as-molded plastic part.

22. The method of claim 11, wherein said tube or pipe portions have a length in the range of 1 mm to 5 mm.

23. A method for welding together plastic parts to form an assembly or part of an assembly comprising:

positioning an as-molded first plastic part including a tube or pipe portion in a first tooling structure by pushing the first plastic part through an first interference region in the first tooling structure to a snap-nested position in which the part is held in place by interference with the interference region;

positioning a second plastic part including a tube or pipe portion in a second tooling structure by pushing the second plastic part through a second interference region in the second tooling structure to a snap-nested position in which the part is held in place by interference with the second interference region, such that the respective tube or pipe portions of the first and second plastic parts are axially aligned and facing each other in a separated start position with a gap between facing ends of the respective tube portions;

positioning a radiant heating element in the gap without physically contacting the respective tube or pipe portions to heat the facing ends to a melted state;

removing the radiant heating element from the gap;

providing relative motion between the first and second tooling structures along an axis to respective weld positions to bring the facing ends of the respective first and second plastic parts together, leaving the first and second tooling structures in said weld positions until the parts have cooled to weld the first and second parts at said respective ends to form an assembly; and wherein said first plastic part is a manifold cell structure, having a tubular body portion, said tubular portion extending axially from a first end of the tubular body portion, and second and third opposed tubular portions extending from an intermediate portion of the tubular body portion transverse to the tubular portion, and wherein said positioning first plastic part in a first tooling structure and positioning the first plastic part in the first tooling structure in a snap-nested position comprises:

pushing the first part downwardly in a generally U-shaped channel in the first tooling structure such that the tubular body portion of the first part engages and is pushed past an interference region of the channel of reduced dimension to nest the first part into the snap-nested position at the bottom of the channel.

24. The method of claim 23, wherein the first tooling structure further includes a transverse portion having opposed generally U-shaped channels to support said second and third opposed tubular portions at said engaged position to prevent rotation of said first part in said first tooling structure.

25. A method for welding together plastic parts to form an assembly or part of an assembly comprising:

positioning an as-molded first plastic part including a tube or pipe portion in a first tooling structure by pushing the first plastic part through an first interference region in the first tooling structure to a snap-nested position in which the part is held in place by interference with the interference region without the use of multi-piece clamps to hold the first plastic part during heating and welding;

wherein said positioning the first plastic part in the first tooling structure in a snap-nested position comprises pushing the first part downwardly into a generally U-shaped channel in the first tooling structure such that the tubular body portion of the first part engages and is pushed past an interference region of the channel of reduced dimension to nest the first part into the snap-nested position at the bottom of the channel and supporting a body portion of the first part in a transverse portion of the first tooling structure;

positioning a second plastic part including a tube or pipe portion in a second tooling structure by pushing the second plastic part downwardly into a generally U-shaped channel in the second tooling structure through a second interference region in the second tooling structure to a snap-nested position in which the second plastic part is held in place by interference with the second interference region without the use of multi-piece clamps to hold the second plastic part during heating and welding, such that the respective tube or pipe portions of the first and second plastic parts are axially aligned and facing each other in a separated start position with a gap between facing ends of the respective tube portions;

positioning a radiant heating element in the gap without physically contacting the respective tube or pipe portions to heat the facing ends to a melted state;

removing the radiant heating element from the gap;

providing relative motion between the first and second tooling structures along an axis to respective weld positions to bring the facing ends of the respective first and second plastic parts together to weld the first and second parts at said respective ends to form an assembly.

26. The method of claim 25, further comprising:

removing the assembly from the tooling structures in said weld positions by lifting the assembly in a direction transverse to the axis to overcome the interference of the first and second interference regions without opening any multi-piece clamps.

* * * * *